March 31, 1964   H. S. TAYLOR   3,126,738
MARINE SPEEDOMETER
Original Filed Feb. 23, 1956
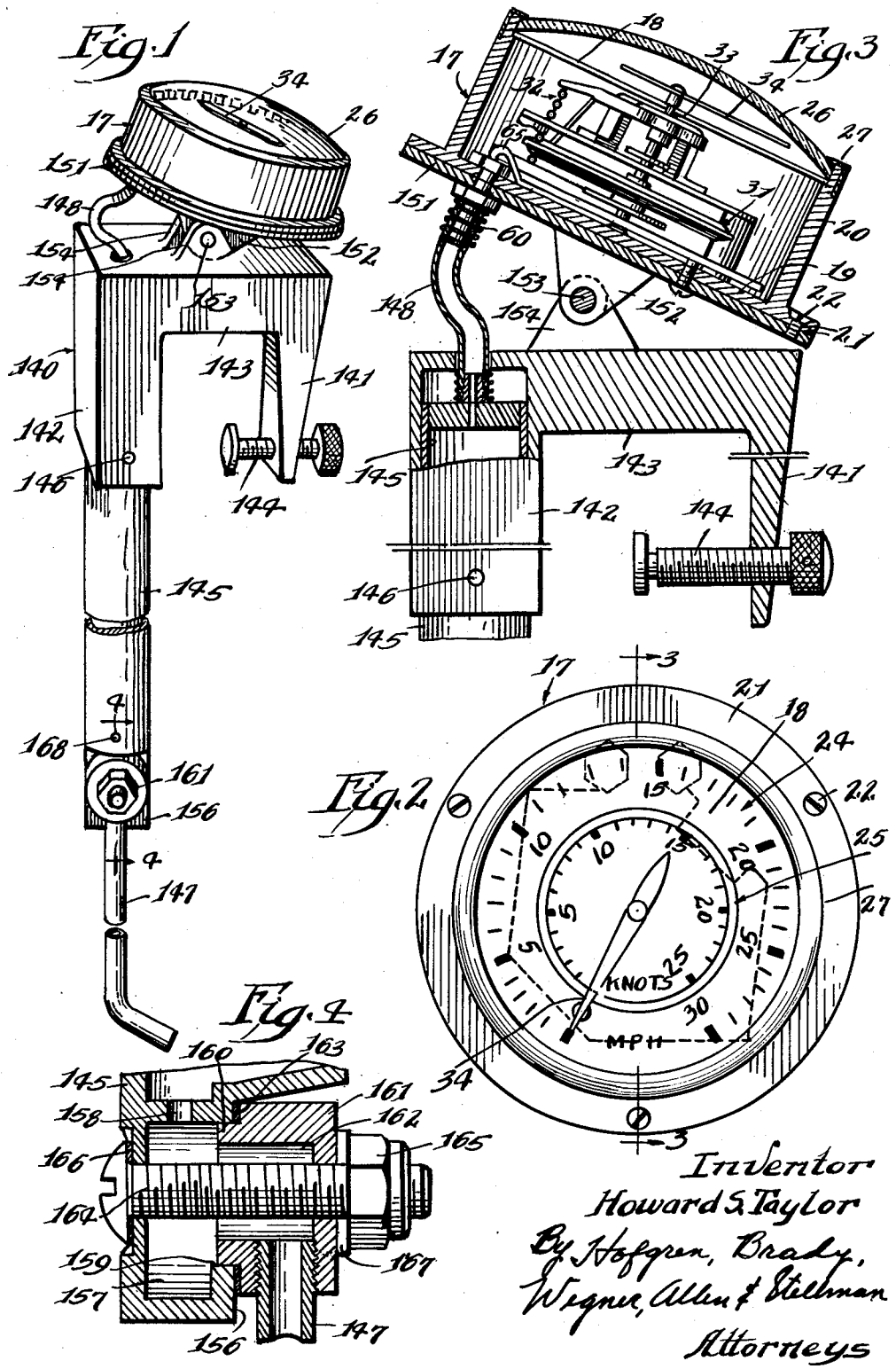
Inventor
Howard S. Taylor
By Hofgren, Brady,
Wegner, Allen & Stellman
Attorneys

United States Patent Office 3,126,738
Patented Mar. 31, 1964

1

3,126,738
MARINE SPEEDOMETER
Howard S. Taylor, Fox River Grove, Ill., assignor to Airguide Instrument Company, a corporation of Illinois
Original application Feb. 23, 1956, Ser. No. 567,132, now Patent No. 2,977,794, dated Apr. 4, 1961. Divided and this application Oct. 27, 1960, Ser. No. 65,528
1 Claim. (Cl. 73—182)

This application is a division of my copending application Serial No. 567,132, filed February 23, 1956, now Patent No. 2,977,794, granted April 4, 1961.

The present invention relates to marine speedometers and has for a general object the provision of a new and improved marine speedometer.

A more specific object is to provide a new and improved marine speedometer, including a velocity indicating device, a pressure sensitive mechanism for transmitting motion to the indicating device, a Pitot tube for picking up velocity pressure, tubular means connecting the Pitot tube and the pressure sensitive mechanism to subject the latter to velocity pressure, and means mounting the Pitot tube to yield on striking objects in the water.

Another object is to provide a new and improved speedometer of the character mentioned, including a vent to atmosphere in the tubular means adapted to ride near the water surface.

A further object is to provide a velocity pressure pickup for a marine speedometer, including bracket means attachable to a boat, a Pitot tube adapted to extend into water, and means mounting the Pitot tube on the bracket means for movement pivotally about a transverse axis normal to the tube so that the tube may yield on striking objects in the water when the boat is in motion.

Other objects and advantages will become readily apparent from the following detailed description taken in connection with the accompanying drawings, in which:

FIG. 1 is a perspective view illustrating a speedometer construction embodying the principles of the present invention;

FIG. 2 is an enlarged top plan view illustrating the dial face of the speedometer;

FIG. 3 is a fragmentary sectional view taken about the line 3—3 of FIG. 2; and

FIG. 4 is an enlarged fragmentary sectional view taken at about the line 4—4 of FIG. 1.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Insofar as possible, reference numbers utilized in the drawings of this application correspond to the reference numbers applied to corresponding parts in the drawings of my copending application.

Referring now to the drawings in more detail, the invention is illustrated in connection with a speedometer including a speedometer case 17 housing a dial 18. The case 17 includes a flat circular plate 19 forming a bottom wall and having upstanding thereon a cylindrical side wall 20 whose diameter is somewhat less than that of the bottom plate 19 to leave an outer annular flange 21 on the plate 19 for receiving screws such as that indicated at 22 to secure the case 17 on a mounting bracket. Adjacent the upper terminus of the side wall 20, it is recessed internally to form a shoulder which supports the circular dial 18 at its periphery. The dial 18 may be provided with an outer scale 24 having graduations calibrated to indicate speed in miles per hour, and an inner scale 25 having graduations calibrated to indicate speed in knots. The dial 18 is retained in position by a transparent cover 26 of material such as glass. Adjacent its upper terminus the cylindrical side wall 20 of the speedometer case is recessed externally to receive an annular retainer sleeve 27 tightly fitted on the wall 20 and having its upper end turned radially inwardly to overlie and engage the transparent cover 26 to secure the cover in position.

The sleeve 27 may be secured to wall 20 by adhesive means, and the dial 18, the cover 26, and the sleeve 27 may form a pressure tight closure of the chamber in the case 17, if desired, for the purposes described in the aforementioned copending application.

The case 17 houses a pressure sensitive device 31 and a motion transmitting mechanism 32 responsive to the pressure sensitive device for effecting movement of a pointer shaft 33 in response to variations in velocity pressure. The pointer shaft extends upwardly in the case 17 through the center of the dial 18 and at its upper end carries a pointer 34 adapted for angular movement over the scales 24 and 25 on the dial 18. The pressure sensitive device 31 and the motion transmitting mechanism 32 correspond to those shown and described in greater detail in my copending application referred to above.

The speedometer case 17 is supported by a mounting bracket 140 of a generally U-shaped configuration including a relatively thin leg 141, a relatively thick leg 142 and a transversely extending connecting member 143 which are formed to permit mounting of the speedometer on a part of a boat such as a transom. The mounting bracket may then be clamped into position by means of a clamping screw 144 threaded into the lower portion of the relatively thin leg 141. The case 17 is secured by screws 22 to the upper surface of a flat circular plate 151 formed with a centrally disposed, depending ear 152 which is pivotally supported by means of a pivot pin 153 in turn supported at opposite ends in a pair of upwardly extending ears 154 formed on the upper surface of the mounting bracket 140. In this manner, the speedometer is adjustably mounted for pivotal movement about the axis of the pivot pin 153 to adjustably position the speedometer case relative to the viewer so that the dial will be readily visible.

Velocity pressure is transmitted to the pressure sensitive device 31 for converting variations in velocity pressure to increments of movement in the device 31 in turn transmitted by the mechanism 32 for effecting movement of the pointer 34 relative to the dial 18. Velocity pressure is applied to the device 31 by means of a tube 65 leading from the interior of the pressure sensitive device and connected as by soldering to a tubular fitting 60 mounted in the plates 19 and 151. The fitting 60 is in turn connected to the upper end of a flexible length of tubing 148 having its lower end connected to a relatively large tube 145 mounted in a bore in the mounting bracket leg 142. A set screw 146 secures tube 145 in position. The tube in turn connects with a Pitot tube 147 adapted to extend into water during movement of a vessel on which the speedometer is used. The Pitot tube terminates in a forwardly extending end portion having a forwardly facing inlet opening.

Pitot tube 147 is pivotally supported on the relatively larger tube 145 for movement about an axis normal to the axes of the tubes so as to yield by pivotal movement on striking an object in the water during motion of the boat. The pivotal connection of the Pitot tube with the tube 145 is provided by forming the lower end portion of the tube 145 of a semitubular or half tubular configuration so as to present a flattened surface 156 which, as illustrated, lies in the plane of a diameter through the center of the tube 145. This construction forms an inlet chamber 157 in the lower extremity of the tube 145 connected by a port 158 to the main passage through the tube 145. The flattened wall 156 is formed with a circular inlet opening 159 adapted to rotatably receive the reduced terminus 160 of a hollow head 161 provided on the upper end of the Pitot tube 147.

The head 161 may be secured to the upper end of the pitot tube by means such as welding, or the pitot tube may be threaded into the head and sealed by adhesive; in either case, the Pitot tube is mounted such that the passage therethrough communicates with a chamber 162 formed inside the head 161. The head 161 is mounted against the flattened wall 156 with a washer 163 between the two parts to provide a sealed joint. The parts are held in place by means of a bolt 164 and nut 165, with a washer 166 bearing between the head of the bolt and the reduced end of the tube 145, and with a washer 167 bearing between the nut 165 and the head 161. The nut 165 may be tightened so that the washers provide a sealed joint and yet permit pivotal movement of the Pitot tube to yield on striking objects in the water.

The tube 145 is provided with a small outlet 168 opening to atmosphere at the side of the tube. The outlet 168 is positioned so as to be at or near the level of the water when the speedometer is mounted on a boat and the boat placed in water. When the boat with the speedometer mounted thereon is initially placed in water, water rises in the Pitot tube and air trapped inside the pitot tube and the tube 145, unless permited to escape, is thereby compressed to an extent sufficient to affect the position of the indicating pointer so that readings thereafter from the speedometer may be inaccurate. The outlet opening 168 permits the air to escape so that the initial position of the pointer is unaffected.

Additionally, on removing the speedometer from water, unless the tube 145 is vented, some water may be retained inside the tube 145 or the Pitot tube 147 by virtue of suction effects inside the tubes. Hence, if the speedometer is thereafter tilted to an upside down position, any such water may flow to the interior of the pressure sensitive device 31, which, for a number of reasons, is an undesirable condition. The outlet opening 168 functions to vent the tube 145 so as to permit the water to flow from the tubes 145 and 147 when the speedometer is removed from the water.

The size of the opening 168 is such that, when the speedometer is in use, any loss of air or water through the opening is inconsequential and does not materially affect the velocity pressure or the accuracy of the speedometer reading.

I claim:

A marine speedometer, comprising, a mounting bracket adapted to be mounted on a boat, a speedometer case including an indicating device having a movable part for indicating velocity, a pressure sensitive mechanism housed in the case for transmitting motion to the movable part, tubular means supported on said bracket including a tubular element connected at one end with said pressure sensitive mechanism and having at the other end a flat exterior surface parallel to the axis of the tubular element and provided with an inlet opening, a Pitot tube having a hollow head secured thereon at the outlet end, said hollow head communicating with the passage in the Pitot tube and having a flat exterior surface adapted to abut against the flat exterior surface on the tubular element and having an outlet opening adapted to register with the inlet opening in the tubular element, and means for pivotally securing the hollow head to the tubular element in pressure tight relation for movement about an axis normal to the axis of said tubular element with said outlet opening and said inlet opening in register, so that the Pitot tube is thereby mounted to yield by pivotal movement on striking objects in the water during movement of the boat.

References Cited in the file of this patent
UNITED STATES PATENTS

| | | |
|---|---|---|
| 153,550 | Elliott | July 28, 1874 |
| 1,869,974 | Masters | Aug. 2, 1932 |
| 1,885,933 | Masters | Nov. 1, 1932 |
| 2,773,383 | Kersten | Dec. 11, 1956 |